(12) United States Patent
Jordache et al.

(10) Patent No.: US 6,288,985 B1
(45) Date of Patent: Sep. 11, 2001

(54) MICROACTUATOR FOR FINE TRACKING IN A MAGNETO-OPTICAL DRIVE

(75) Inventors: Nicholas Jordache, Eden; Edward Gage, Apple Valley, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/148,168

(22) Filed: Sep. 4, 1998

Related U.S. Application Data

(60) Provisional application No. 60/059,488, filed on Sep. 22, 1997.

(51) Int. Cl.$^7$ .................................................. G11B 7/12
(52) U.S. Cl. ................................ 369/44.23; 369/44.14; 369/112
(58) Field of Search ........................... 369/44.14, 44.12, 369/44.15, 44.16, 44.19, 44.21, 44.22, 44.23, 112

(56) References Cited

U.S. PATENT DOCUMENTS

| | | | |
|---|---|---|---|
| 4,605,977 | 8/1986 | Matthews | 360/103 |
| 4,651,242 | 3/1987 | Hirano et al. | 360/103 |
| 4,853,810 | 8/1989 | Pohl et al. | 360/103 |
| 5,021,906 | 6/1991 | Chang et al. | 360/103 |
| 5,105,408 | 4/1992 | Lee et al. | 369/44.15 |
| 5,189,578 | 2/1993 | Mori et al. | 360/106 |
| 5,197,050 | * 3/1993 | Murakami et al. | 369/44.22 X |
| 5,216,559 | 6/1993 | Springer | 360/106 |
| 5,276,573 | 1/1994 | Harada et al. | 360/103 |
| 5,303,105 | 4/1994 | Jorgenson | 360/106 |
| 5,497,359 | * 3/1996 | Mamin et al. | 369/44.14 X |
| 5,521,778 | 5/1996 | Boutaghou et al. | 360/106 |
| 5,657,188 | 8/1997 | Jurgenson et al. | 360/106 |
| 5,917,788 | * 6/1999 | Mowry | 369/44.14 X |

FOREIGN PATENT DOCUMENTS 0 549 814 A1    7/1973   (EP) .

OTHER PUBLICATIONS

U.S. application No. 08/852,087, Boutaghou, filed May 7, 1997, pending.
U.S. application No. 08/895,257, Gage et al., filed Jul. 15, 1997, pending.
U.S. application No. 08/930,134, Berg et al., filed Oct. 30, 1997, pending.
U.S. application No. 08/006,654, Boutaghou, filed Jan. 14, 1998, pending.
U.S. application No. 09/007,007, Norotny, filed Jan. 14, 1998, pending.
U.S. application No. 09/010,100, Zhang, filed Jan. 21, 1998, pending.
U.S. application No. 09/068,670, filed Jan. 7, 1998, pending.
"An 86 mm magneto-optical disk drive with a compact and fast-seek-time optical head", by Naoya Eguchi et al., Optical Data Storage, Proc. SPIE vol. 1316, pp. 2–10 (1990).

(List continued on next page.)

*Primary Examiner*—Muhammad Edun
(74) *Attorney, Agent, or Firm*—Westman, Champlin & Kelly PA

(57) ABSTRACT

A storage device for retrieving data stored on a medium includes a lens having a focal axis. The storage device also includes a light source capable of generating light having a direction of propagation that is substantially parallel to the focal axis of the lens as the light passes through the lens. A support assembly supports the lens over the medium and a lens actuator coupled to the support assembly is capable of moving the lens relative to the light while maintaining the focal axis of the lens substantially parallel to the direction of propagation of the light through the lens.

19 Claims, 16 Drawing Sheets

OTHER PUBLICATIONS

"Piezoelectric Microactuator Compensating for Off–Track Errors in Magnetic Disk Drives", by Takahiro Imamura et al., Advances in Information Storage Systems, vol. 5 pp. 119–126.

"Dynamic Loading Criteria for 3–1½ Inch Inline HDD Using Multilayer Piezoelectric Load/Unload Mechanism", by H. Kajitani et al., IEEE Transactions on Magnetics, vol. 27, No. 6, Nov. 1991 pp. 5079–5081.

"A Dual–Stage Magnetic Disk Drive Actuator Using A Piezoelectric Device For A High Track Density", by K. Mori et al., IEEE Transactions on Magnetics, vol. 27, No. 6, Nov. 1991 pp. 5298–5300.

"Magnetic Recording Head Positioning at Very High Track Densities Using a Microactuator–Based, Two–Stage Servo System" by Long–Sheng Fan et al., IEEE Transactions on Industrial Eelctronics, vol. 42, No. 3, Jun. 1995 pp. 222–233.

"Silicon Micromachined Electromagnetic Microactuators for Rigid Disk Drives" by Weilong Tang et al., IEEE Transactions on Magnetics, vol. 31, No. 6. Nov. 1995, pp. 2964–2966.

"Transverse Mode Electrostatic Microactuator For Mems–Based HDD Slider" by Takahiro Imamura et al., pp. 216–221.

"A Flexural Piggyback Milli–Actuator for Over 5 Gbit/in.$^2$ Density Magnetic Recording" by S. Koganezawa et al., IEEE Transactions on Magnetics, vol. 32, No. 5 Sep. 1996 pp. 3908–3910.

"An Experiment for Head Positioning System Using Sub-micron Track–width GMR Head" by Norio Yoshikawa et al., IEEE Transactions on Magnetics. vol. 32, No. 5, Sep. 1996 pp. 3905–3907.

"Handbook of Magneto–Optical Data Recording" by Terry W. McDaniel et al., Noyes Publications, 1997, pp. 148–156, 176–204.

"Micro Electrostatic Actuators In Dual–Stage Disk Drives With High Track Density" by Y. Tang et al., IEEE Transactions on Magnetics. vol. 32, No. 5. Sep. 1996, pp. 3851–3853.

* cited by examiner

US 6,288,985 B1

MICROACTUATOR FOR FINE TRACKING IN A MAGNETO-OPTICAL DRIVE

REFERENCE TO RELATED APPLICATION

The present application claims priority from U.S. Provisional Application Serial No. 60/059,488 entitled MICROACTUATOR FOR FINE TRACKING IN A MAGNETO-OPTICAL DRIVE, which was filed on Sep. 22, 1997.

BACKGROUND OF THE INVENTION

The present invention relates to storage devices for computer systems. In particular, the present invention relates to optical and magneto-optical storage devices.

In optical and magneto-optical storage devices for computer systems, a beam of light is projected on to a disc surface that reflects the light in to a sensor. The surface of the dine is patterned to represent data that is typically stored in concentric tracks around the disc. The data is read from the disc by positioning the beam of light over a particular track on the disc and sensing the intensity and polarity of the reflected light from the disc.

To position the beam of light over a particular track, the art currently uses a course actuator in combination with a galvo-mirror assembly. The course actuator moves a lens assembly and a turning mirror over the disc. The light beam is projected toward the turning mirror, which reflects the light beam down into the lens assembly causing the light to focus on a track on the disc. The galvo-mirror assembly is used to direct the light toward the turning mirror. By applying an electrical current to the galvo-mirror assembly, the angle at which the light beam strikes the turning mirror and the lens assembly can be changed. By changing the angle at which the light beam is incident on the lens assembly, it is possible to move the light beam across one or more tracks while keeping the lens assembly fixed over a particular track. Thus, the galvo-mirror assembly provides fine control of the light beam.

Although the position of the light beam can be changed quickly using the galvo-mirror assembly, the light beam provided by the galvo-mirror system is less than ideal. In particular, at some angles of incidence of the light beam on the lens, the light beam can suffer from coma and astigmatism. Coma causes the spot of light on the disc to have a flare distribution and astigmatism causes different polarities of the light to focus at different distances relative to the surface of the disc. Thus, a fine control actuator is needed that can move the spot of light on the disc without causing as many imperfections in the spot of light.

SUMMARY OF THE INVENTION

A storage device for retrieving data stored on a medium includes a lens having a focal axis. The storage device also includes a light source capable of generating light having a direction of propagation that is substantially parallel to the focal axis of the lens as the light passes through the lens. A support assembly supports the lens over the medium and a lens actuator coupled to the support assembly is capable of moving the lens relative to the light while maintaining the focal axis of the lens substantially parallel to the direction of propagation of the light through the lens.

Under the present invention, a disc drive for a computer system includes a lens capable of directing light and a light beam production assembly capable of creating a light beam and directing the light beam toward the lens. A lens support structure supports the lens and a coarse actuator coupled to the light beam production assembly and the lens support structure moves the lens support structure and the light beam production assembly so that the lens moves to different positions over the disc while substantially maintaining a position of the light beam within the lens. A fine actuator coupled to the lens support structure is capable of moving the lens while substantially maintaining a position of the light beam relative to the disc.

DETAILED DESCRIPTION OF THE PREFERRED EMBODIMENTS

Figure 1:
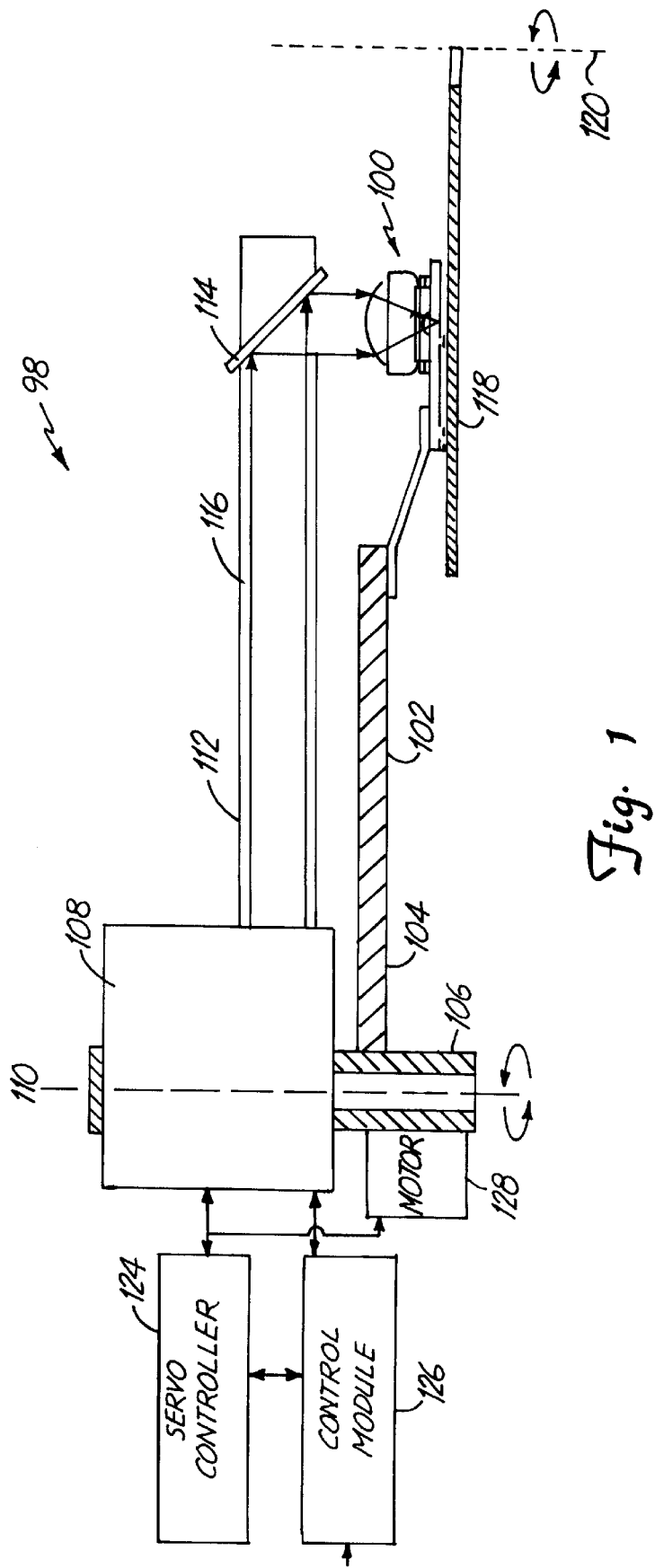
FIG. 1 is a side view of a magneto-optical disc drive.

FIG. 1 is a side view of an optical storage system 98 of one embodiment of the present invention. An optical module 108, which includes a laser, creates a light beam 116 that is directed through an enclosed optical path 112 extending laterally from optical module 108. Light beam 116 reflects off a mirror 114 toward an optical head 100, which focuses the collimated beam into a small spot on a disc 118. Together, optical module 108, optical path 112 and mirror 114 provide a light beam production assembly.

Disc 118 spins about a central axis 120, continuously bringing new data regions underneath the spot of light produced by optical head 100. The light incident on disc 118 is reflected back through enclosed optical path 112 and is analyzed by a control module 126 and a servo controller 124 attached to optical module 108. Through this process, optical storage system 98 retrieves data and servo information stored on disc 118. Optical head 100 is supported by a support assembly 102 that includes an actuator arm 104. Actuator arm 104, optical module 108, and enclosed optical path 112 are all supported by a spindle 106, which rotates about a central axis 110. As spindle 106 rotates, head 100 moves to different radial positions across disc 118 and enclosed optical path 112 rotates to remain aligned with optical head 100. Servo controller 124 rotates spindle 106 by controlling a motor 128 connected to spindle 106 based on servo information read from the disc, and a desired position produced by control module 126. Together, servo controller 124, motor 128, and spindle 106 form a coarse actuator for positioning the head over the disc.

Figure 2:
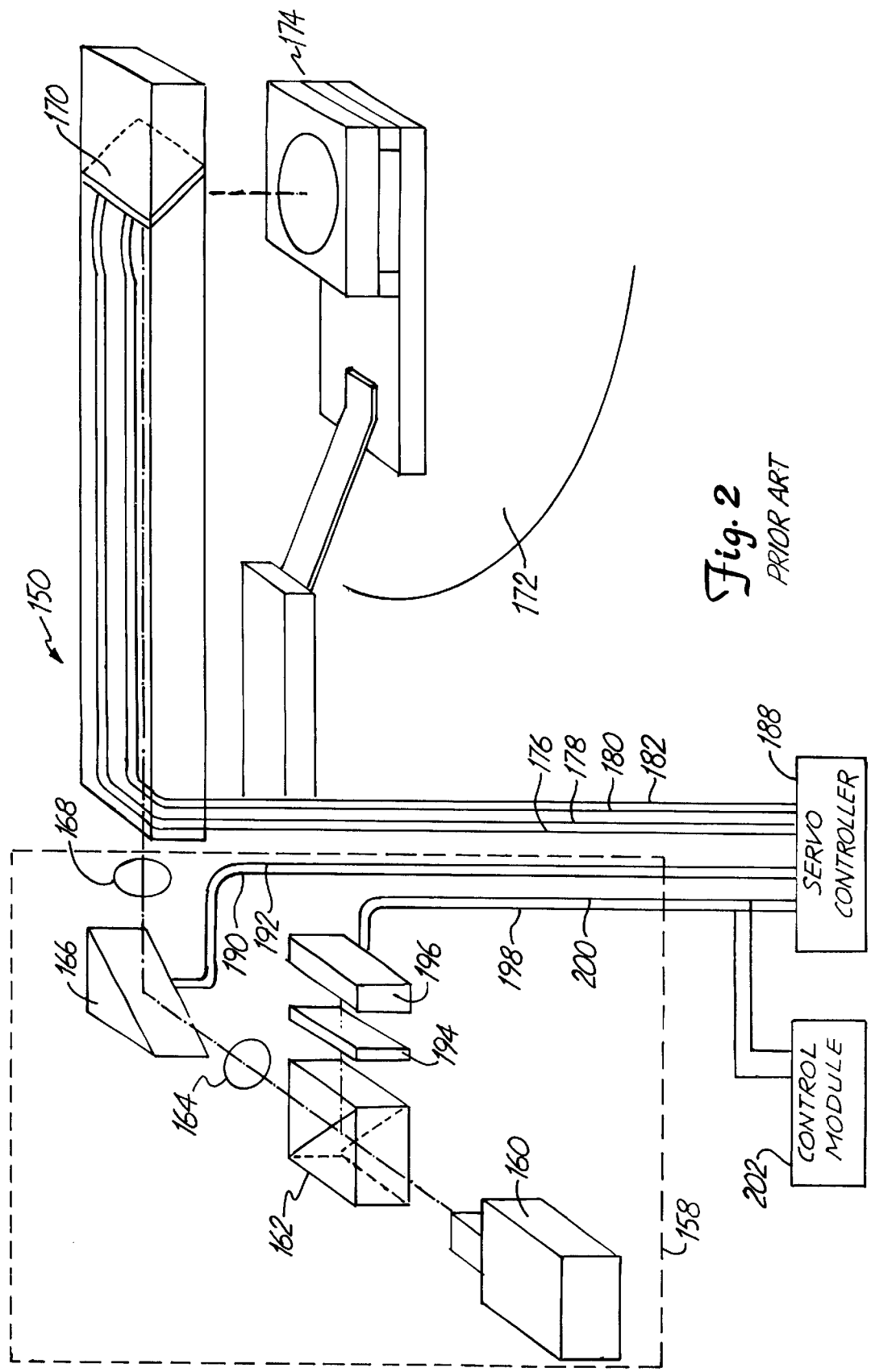
FIG. 2 is a schematic diagram of a prior art magneto-optical disc drive.

FIG. 2 is a schematic diagram of optics in an optical system 150 of the prior art. Within an optical module 158, a laser diode 160 generates a light that passes through a beam splitter 162 and a relay lens 164, reflects off a galvo-mirror 166, is collimated by an imaging lens 168, reflects off tracking position sensor 170, and is focused onto a disc 172 by optical head 174. Based on the light incident on tracking position sensor 170, portions of the sensor create electrical signals carried on electrical conductors 176, 178, 180, and 182 to a servo controller 188. Servo controller 188 uses the electrical signals to control the rotation of galvo-mirror 166 through electrical conductors 190, 192. The rotation of galvo-mirror 166 changes the location of the focused light spot on disc 172 and changes the electrical signals produced by tracking position sensor 170. Through galvo-mirror 166, it is possible to move the focused spot across several tracks under the prior art. However, as galvo-mirror 166 shifts the light beam it changes the angle at which the light beam passes through optical head 174. At some angles, this cause coma and/or astigmatism.

Some of the light incident on optical disc 172 reflects off optical disc 172, returns through head 174, reflects off tracking position sensor 170, passes through imaging lens 168, reflects off galvo-mirror 166, passes through relay lens 164, is reflected by beam splitter 162, passes through a Wollaston prism 194, and comes to focus either before or after a detector plane 196, which generates an electrical signal on electrical conductors 198 and 200 indicative of the light that is incident on detector plane 196. Conductors 198 and 200 carry the electrical signal to servo controller 188, which uses the electrical signal to control galvo-mirror 166 and to position optical head 174. Conductors 198 and 200 also carry the electrical signal produced by detector plane 196 to control module 202.

Figure 3:
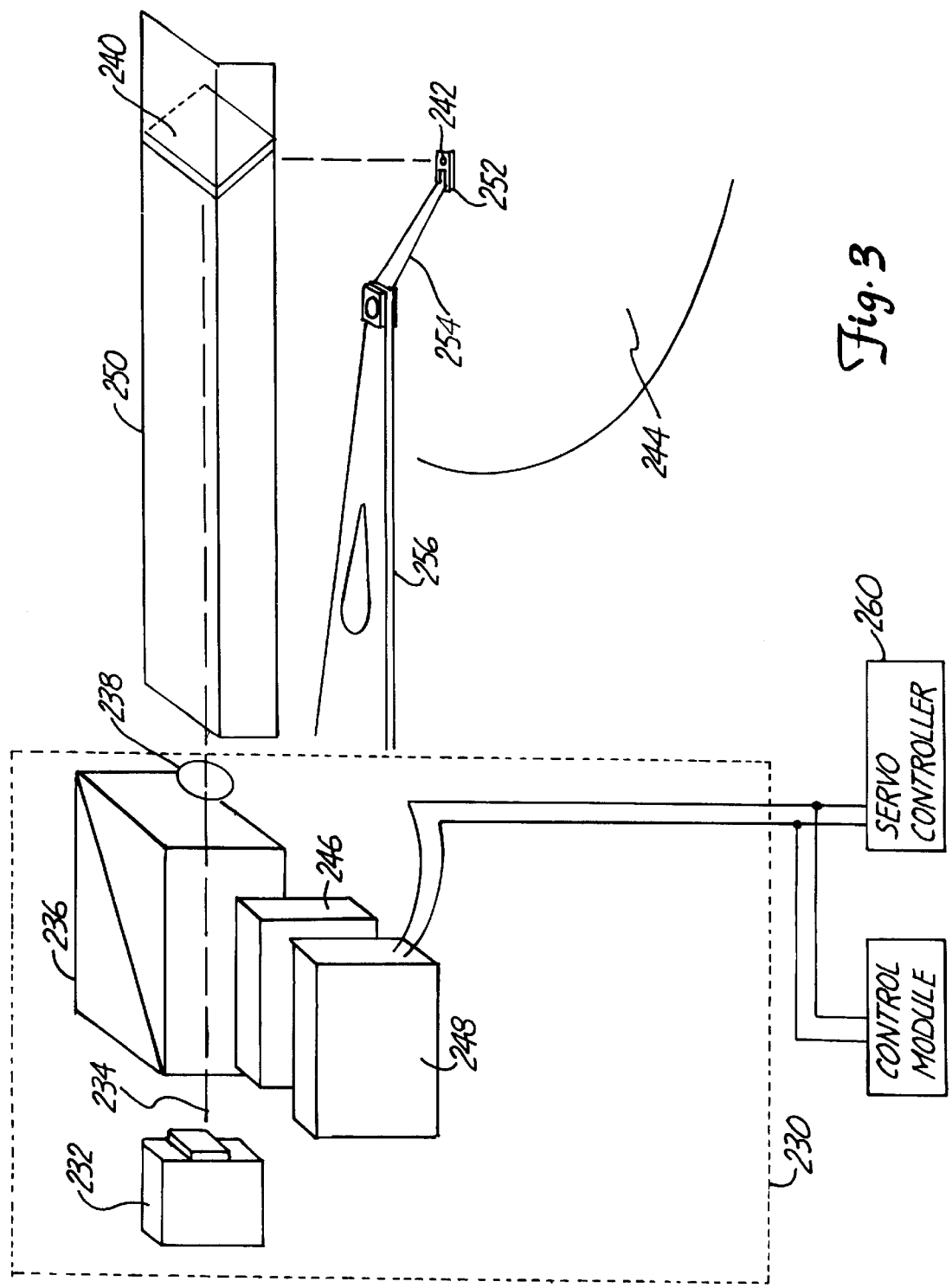
FIG. 3 is a schematic diagram of a magneto-optical drive of the present invention.

FIG. 3 is a schematic diagram of optics 230 of an optical system of one embodiment of the present invention. Optics 230 includes a laser 232 that generates a beam of light 234, which passes through a beam splitter 236, and a lens 238 and is reflected off of a turning mirror 240 toward an optical head 242. Optical head 242 focuses the beam into a spot on disc 244. Light reflects off disc 244 back through optical head 242, reflects off turning mirror 240, passes through lens 238, reflects off beam splitter 236 into Wollaston prism 246 and comes to focus either before or after a detector plane 248.

Turning mirror 240 is supported by an arm 250 and head assembly 242 supported by a slider 252, a load beam 254, and an actuator arm 256. Although not shown, an actuator motor moves actuator arm 256 and support 250 in unison over the disc under the direction of the signals received from servo control 260.

Under the present invention, servo controller 260 is also connected to one or more microactuators located somewhere along actuator arm 256, load beam 254, and/or slider 252. Embodiments showing specific locations for the microactuators are discussed below in connection with figures that better show the placement and operation of the microactuators.

Figure 4:
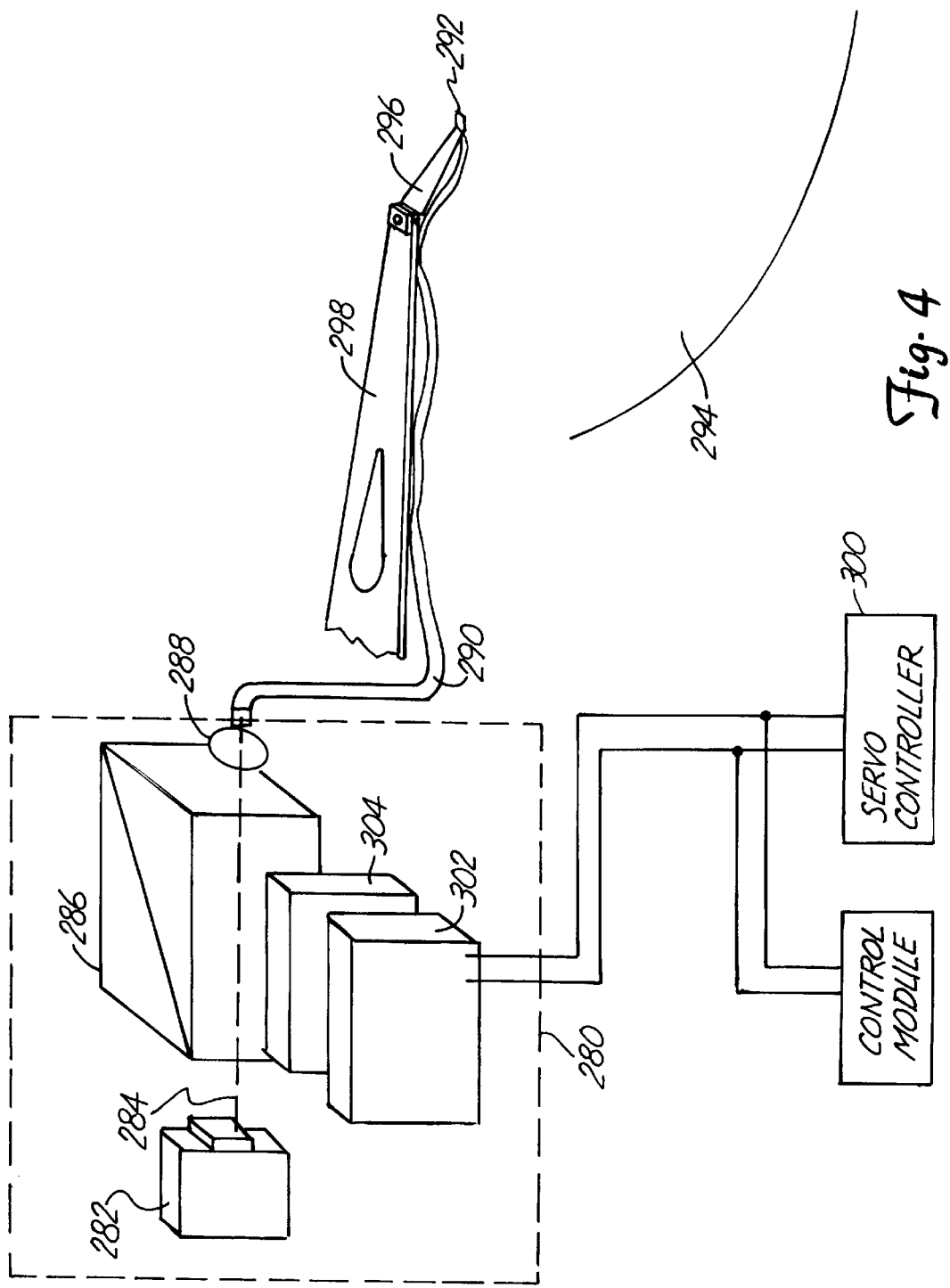
FIG. 4 is a perspective view of another embodiment of a magneto-optical disc drive of the present invention.

FIG. 4 is a schematic diagram of an optical system under a further embodiment of the present invention. In FIG. 4, the optical system includes optics 280, which has a laser diode 282 that generates a light beam 284. Light beam 284 passes through beam splitter 286, relay lens 288 and into optical fiber 290. Optical fiber 290 is connected to slider 292 which also includes further optics that direct the light beam as a focused spot onto disc 294. Slider 292 is connected to a load beam 296 through a gimbal. Load beam 296 is further connected to actuator arm 298, which is moved by a coarse actuator that is not shown for clarity. The coarse actuator is controlled by servo controller 300, which receives servo position information from detector plane 302 in optics 280. Detector plane 302 detects a light beam that reflects from disc 294 through optical fiber 290, relay lens 288, beam splitter 286, and a Wollaston prism 304. As in FIG. 3, servo controller 300 of FIG. 4 is also connected to at least one microactuator positioned somewhere along actuator arm 298, load beam 296, and/or slider 292. The specific locations for the microactuator are discussed below in connection with specific embodiments of the invention.

Note that in FIGS. 2, 3, and 4, the optic system and the slider are not shown to scale so that the details of the optic system may be shown more clearly.

Figure 5:
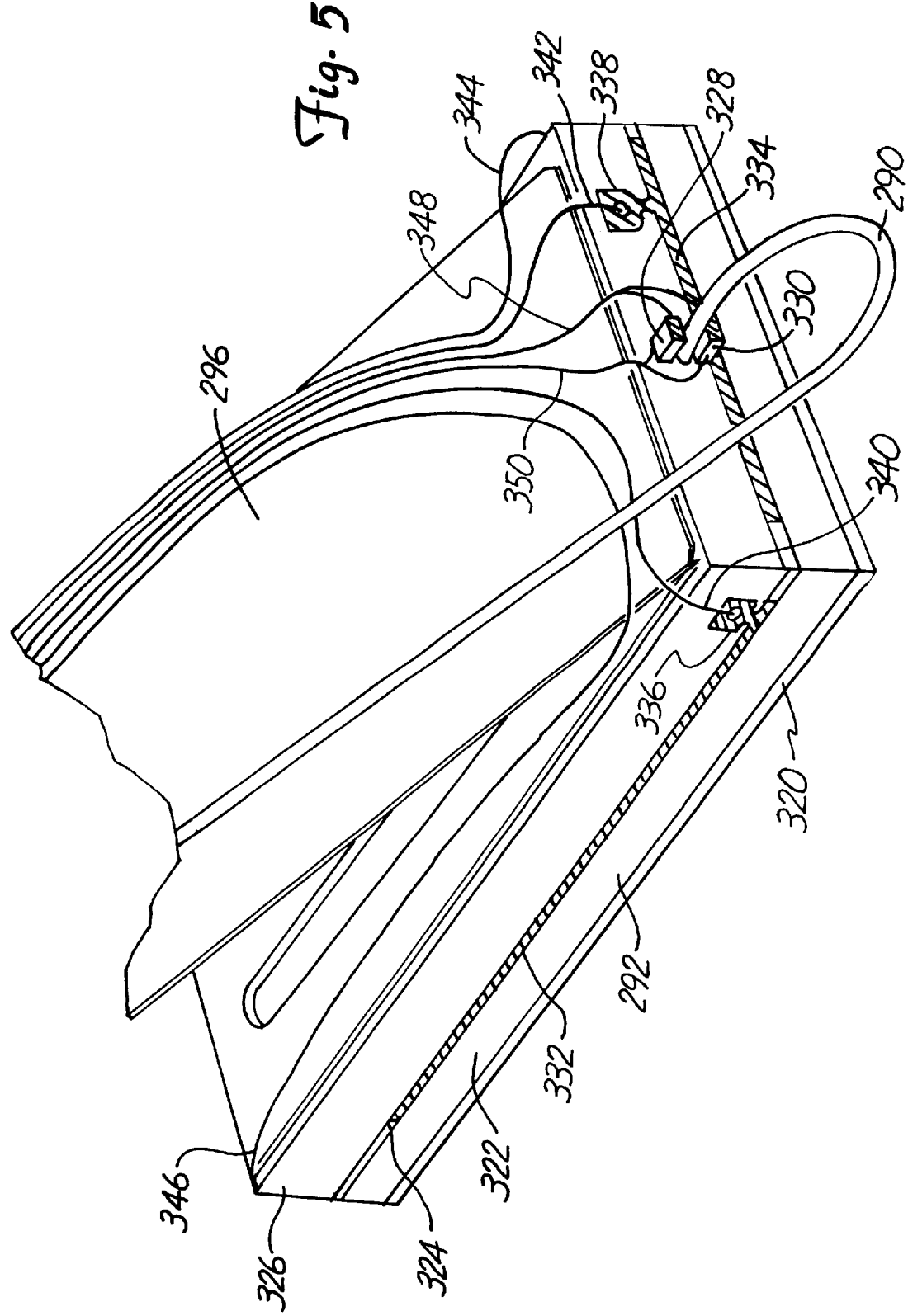
FIG. 5 is a perspective view of a magneto-optical slider of one embodiment of the present invention.

FIG. 5 is a perspective view of slider 292 of FIG. 4 and its attachment to load beam 296. Slider 292 includes zirconia oxide layer 320, silicon layer 322, electrostrictive polymer 324, second silicon layer 326, and electrosestrictive polymer pads 328 and 330. A lateral conductive coating 332 extends along a side surface of electrostrictive polymer 324. An end conductive coating 334 extends along the end of electrostrictive polymer 324 at the trailing end of slider 292. Conductive pads 336 and 338 make electrical connections to conductive coatings 332 and 334, respectively. Conductors 340 and 342 are bonded to pads 336 and 338, respectively, and carry electrical signals to the respective pads. A conductor 344 connects to a pad similar to pad 336 on the side of slider 292 opposite the side containing pad 336. The actual signals carried on conductors 340 and 344 cooperate to produce an electrical field across slider 292. Similarly, a conductor 346 is connected to a pad (not shown) opposite pad 338 on slider 292 and provides an electrical signal that cooperates with the electrical signal provided on conductor 342 to generate an electrical field across slider 292 from the leading edge to the trailing edge.

A conductor 348 attaches to conductive films on electrostrictive polymer tabs 328 and 330, and conductor 350 connects to conductive films on opposite ends of electrostrictive polymer tabs 328 and 330 from the conductive films connected to conductor 348. Electrical signals carried on conductors 348 and 350 generate electric fields across electrostrictive polymer tabs 328 and 330. The operation of electrostrictive polymer layer 324 and electrostrictive polymer tabs 328 and 330 is discussed below in connection with FIG. 6.

Figure 6:
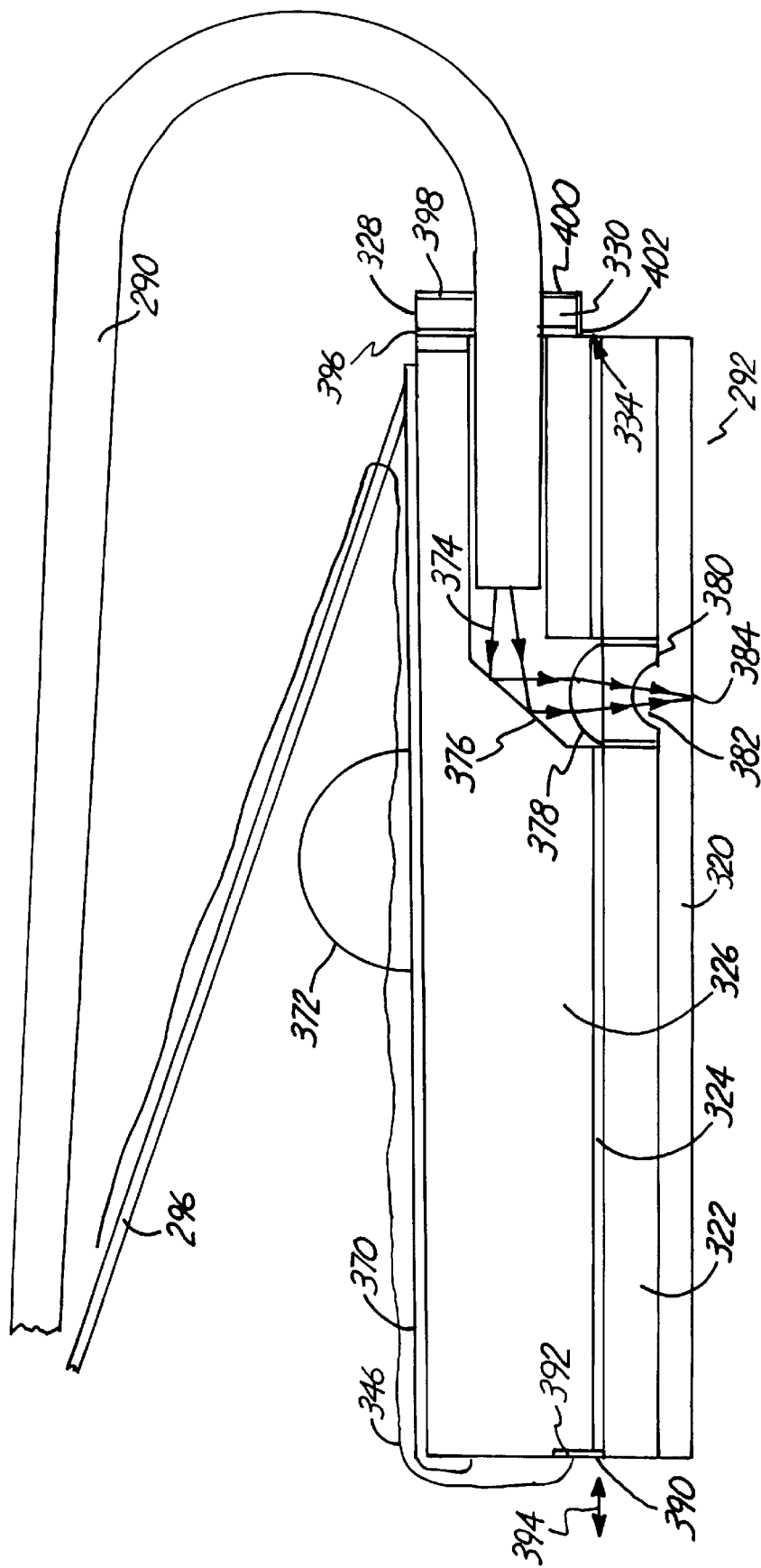
FIG. 6 is a cross-section of the magneto-optical slider of FIG. 5.

FIG. 6 is a cross sectional view of slider 292 of FIG. 5. Slider 292 is attached to load beam 296 through gimbal 370 that includes a bump 372.

Within slider 292, optical fiber 290 projects a light beam 374 that reflects off of a mirrored surface 376 made in second silicon layer 326. The reflected light beam from mirrored surface 376 passes through an objective lens 378 which is mounted on a cylindrical support 380. Objective lens 378 focuses light beam 374 toward a mesa 382 in zirconia oxide layer 320. Mesa 382 further focuses the beam of light into a spot of light 384 at the bottom surface of zirconia oxide layer 320.

Under the present invention, beam of light 374 is not moved by a galvo-mirror assembly to locate spot 384 at different track locations across the disc. Instead, the present invention uses a microactuator to shift objective lens 378 and mesa lens 382 relative to light beam 374.

In FIGS. 5 and 6, this microactuator is formed by electrostrictive polymer layer 324 and conductive coatings 332, 334, 390, and an additional conductive coating opposite conductive coating 332 (not shown). Specifically, when conductors 342 and 346 carry a differential voltage to pads 338 and 392, respectively, conductive coatings 334 and 390 generate an electric field across electrostrictive polymer 324 that causes the polymer to move silicon layer 322, zirconium oxide layer 320, cylindrical support 380, and objective lens 378 relative to beam 374 in a direction parallel to line 394 of FIG. 6. Similarly, when conductors 340 and 344 carry a differential voltage, an electric field develops across electrostrictive polymer 324 such that electrostrictive polymer 324 moves objective lens 378 and mesa 382 in a direction parallel to a direction in and out of the page of FIG. 6.

Note that with this microactuator movement, the angle of incidence of light beam 374 on objective lens 378 remains substantially constant, as does the direction of propagation of beam 374 toward the disc. However, because objective lens 378 and mesa 382 are moving within beam 374, spot 384 moves to different locations as electrostrictive polymer 324 moves the lenses. Because the present invention does not change the angle of incidence of the light beam, the spot of light does not suffer as much from coma and astigmatism.

To enhance focusing of spot 384, the present invention also provides a focusing microactuator comprised of electrostrictive polymer tabs 328 and 330 and conductive films 396, 398, 400, and 402. As noted above, conductive films 398 and 400 are connected to conductor 348 of FIG. 5 and conductive films 396 and 402 are connected to conductor 350 of FIG. 5. Electrostrictive polymer 328 and 330 are connected to optical fiber 290 such that when an electric field is produced across the electrostrictive polymer tabs, optical fiber 290 moves laterally within slider 292. Thus, differential voltage applied across conductors 348 and 350 will cause optical fiber 290 to move within slider 292 in response to movement of electrostrictive polymer tabs 328 and 330.

Figure 7:
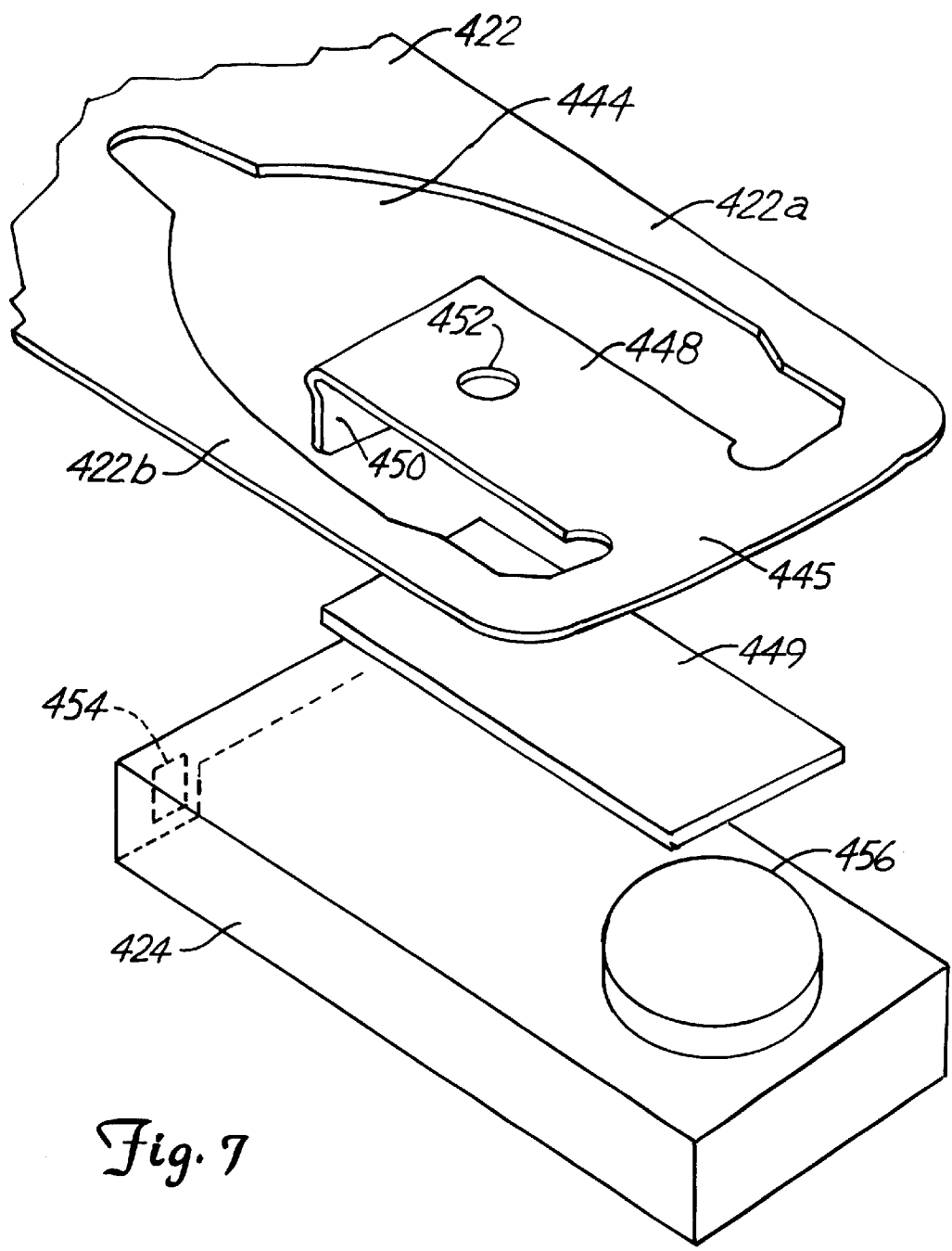
FIG. 7 is an exploded perspective view of a slider and a gimbal of one embodiment of the present invention.

FIG. 7 is an exploded perspective view of a portion of a disc drive system implementing another embodiment of a microactuator of the present invention. Specifically, FIG. 7 shows a gimbal and a slider of an optical drive, such as the drive of FIG. 3, with a leading edge slider microactuator system used to move a lens 456 within a fixed light beam. The disc drive system include a gimbal or flexure 422 mounted to the underside of a distal end of a load beam (not shown). Flexure 422 includes arms 422a and 422b forming aperture 444 therebetween to provide resilience or spring to flexure 422. The distal ends of arms 422a and 422b are connected via cross beam 445. Central tongue 448 extends from cross beam 445 into aperture 444 in a plane generally parallel to a plane defined by flexure arms 422a and 422b. Tongue 448 extends beyond the leading edge surface of slider 424 and includes aperture 452, through which the load beam applies a pre-load force to slider 424. The portion of tongue 448 extending beyond the leading edge surface is bent downward into a right angle to form a flexure tab surface 450, which is generally parallel to the leading edge surface of slider 424. Slider 424 is adhesively attached to flexure tab surface 450, preferably where microactuator 454 is formed on the leading edge surface of slider 424. Optional shear layer 449 may be provided between tongue 448 and slider 424 to minimize the wear on slider 424. Alternatively, a relatively small amount of lubricant may be employed between slider 424 and tongue 448 to achieve a similar result.

A coarse actuator is operated to move an actuator arm and load beam to coarsely position lens assembly 456, which is supported by slider 424, to various positions with respect to tracks on a surface of a disc. Microactuator 454 is formed at the leading edge of the slider, and cooperates with tab surface 450 to distortionally rotate slider 424 and thereby alter the position of lens assembly 456 located at the edge of slider 424. In some embodiments, a second microactuator is formed near the opposite side of the leading edge surface of slider 424, operating in cooperation with microactuator 454 to distortionally rotate slider 424. The specific operation of microactuator 454 is discussed in detail below with respect to FIG. 8.

Figure 8:
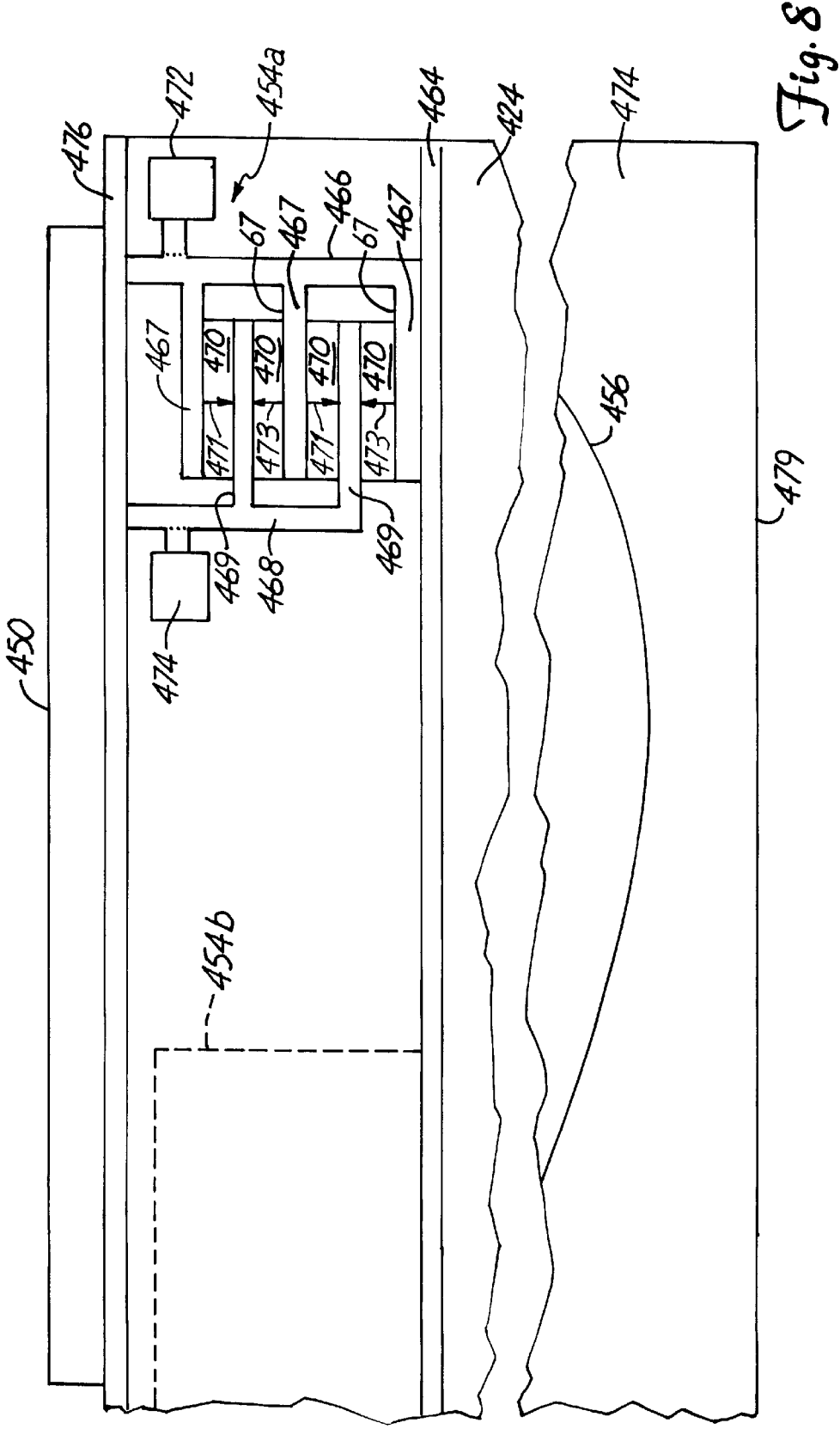
FIG. 8 is a top view of one embodiment of the slider of FIG. 7.

FIG. 8 is a top view of slider 424 and tab surface 450 of gimbal 422 of FIG. 7. Slider 424 includes two stacked piezoelectric microactuators 454a and 454b. Microactuator 454b is identical to, or alternatively is a mirror image of, microactuator 454a, so only microactuator 454a is shown in detail in FIG. 8. Microactuator 454a is formed on insulating base coat 464 on the leading edge of slider substrate 424. Lens assembly 456 is located at trailing edge 479 of slider 424. Microactuator 454a includes right conductive terminal 466 having associated conductive teeth 467, and left conductive terminal 468 having associated conductive teeth 469. Teeth 467 and 469 are interdigitated between successive piezoelectric layers 470 of a stack of piezoelectric layers. Right bond pad 472 and left bond pad 474 are disposed on the outer surface of microactuator 454a, on the same plane as the top surface of slider 424, for example, for electrical connection to right conductive terminal 466 and left conductive terminal 468, respectively. Alternatively, bond pads 472 and 474 may be disposed on overcoat layer 476 where it extends beyond flexure tab surface 450, or on any other accessible surface of slider 424 or microactuators 454a and 454b.

Piezoelectric layers 470 are initially polarized in the directions indicated by arrows 471 and 473, with adjacent piezoelectric layers polarized in opposite directions. Each layer 467, 470, and 469 is formed in succession from the leading edge surface of the slider. After formation of each piezoelectric layer 470, the layer is polarized by applying a large electric field across the layer, thereby orienting the piezoelectric crystals to respond mechanically in a selected direction for an applied voltage across each layer. Alternatively, piezoelectric layers 470 may be poled in full sheet form before application to the previously formed structures. The region surrounding piezoelectric microactuators 454a and 454b is open space or is filled with a compliant material, to allow movement of the components of the microactuators.

It is preferred that piezoelectric microactuators 454a and 454b be formed on insulating base coat 464 and slider body 424 by thin-film wafer techniques. The process for forming piezoelectric layers are well known. An alternative is to form microactuators 454a and 454b separately, and then laminate them to slider 424, but this process is less desirable because it introduces additional fabrication steps to the process and increases the risk of defective parts. While the apparatus has been shown in FIG. 8 as employing a pair of complementary stacked piezoelectric microactuators 454a and 454b, a single microactuator may be employed.

In operation, a first voltage is applied to right bond pad 472, so that right conductor 466 and conductive teeth 467 are energized to a first electrical potential. A second voltage is applied to left bond pad 474 to energize left conductive terminal 468 and conductive teeth 469 to a second electrical potential. The difference between the first electrical potential and the second electrical potential across piezoelectric layers 470 causes all of the layers to either expand or contract.

Microactuator 454a is adhesively attached to flexure tab surface 450 of the disc drive system, so that expansion or contraction of piezoelectric layers 470 of microactuator 454a applies force against flexure tab surface 450 to cause distortional rotation of slider 424. For example, when all piezoelectric layers 470 of microactuator 454a expand, the force pushing against flexure tab surface 450 causes clockwise distortional rotation of slider 424, thereby moving lens assembly 456 at trailing edge 479 of slider 424 in a clockwise arc. In the embodiment where microactuator 454b is also provided, expansion of one microactuator and contraction of the other microactuator complement each other, thereby cooperating to cause distortional rotation of slider 424.

Where optional shear layer 449 is included and bonded to both slider 424 and tongue portion 448 (see FIG. 7), the shear layer provides a compliant attachment of the slider to the gimbal, thus permitting the slider to move about the yaw axis (normal to the disc) and thereby permitting distortional rotation of the slider to finely position the lens assembly relative to a selected track on the disc.

While microactuators 454a and 454b are shown with open space or compliant material between the layers of the microactuators and overcoat 476 abutting flexure tab surface 450, it will be understood that a design arranged such that an end layer of the conductive teeth layers abuts overcoat 476 is also feasible, to push directly against flexure tab surface 450. Thus, selective positioning of lens assembly 456 at the trailing edge of slider 424 can be achieved by expanding and contracting piezoelectric layers 470 of microactuator 454a at the leading edge of slider 424, by regulating the voltages applied to right bond pad 472 and left bond pad 474.

The adhesive connection between microactuator 454a and flexure surface 450 at overcoat layer 476 shown in FIG. 8 is exemplary; flexure surface 450 may be oriented and positioned in any manner to achieve adhesive attachment to microactuator 454a, so that expansion or contraction of piezoelectric layers 470 of microactuator 454a causes distortional rotation of slider 424 to position lens assembly 456.

Figure 9:
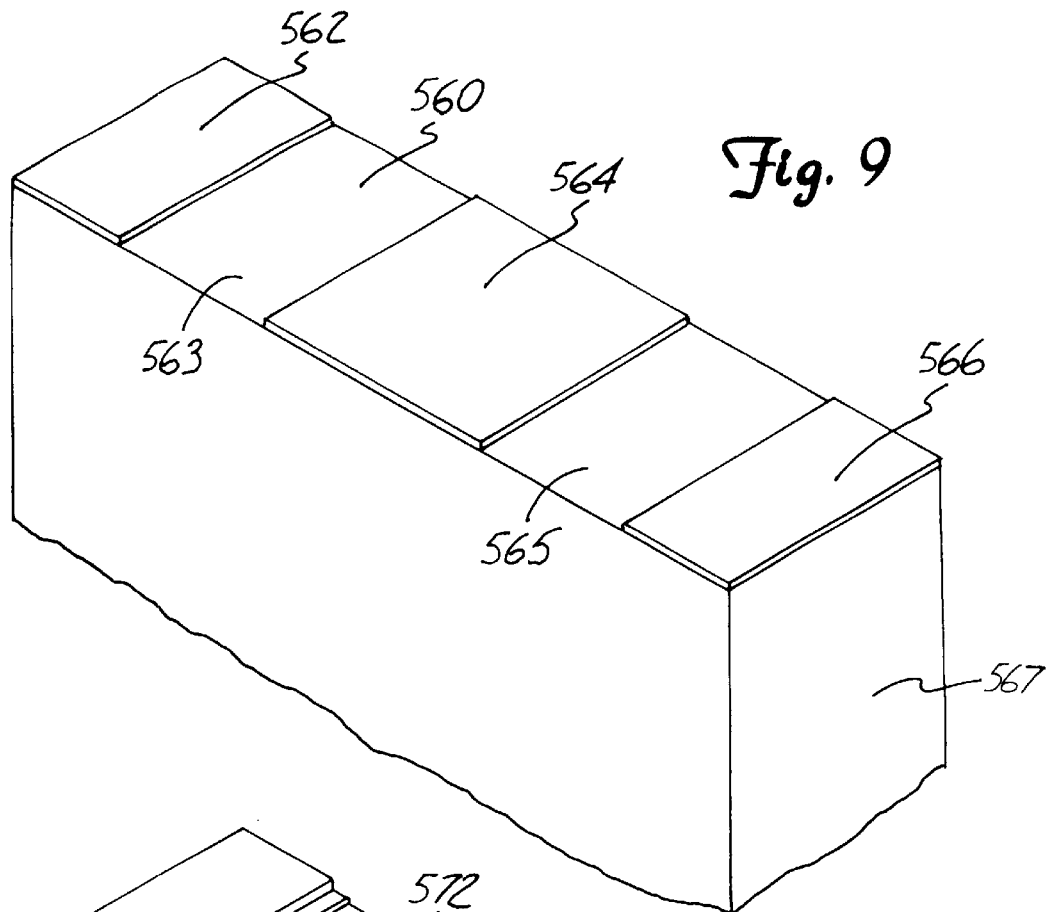
FIGS. 9–14 are perspective views of fabrication stages of a piezoelectric microactuator formed on the leading edge surface of a slider according to an embodiment of the present invention.

FIGS. 9–14 are perspective views illustrating fabrication of a microactuator on a leading edge of a slider 563 that is designed to contact tab portion 450 of FIG. 7 in accordance with another embodiment of the present invention. As shown in FIG. 9, hills 562, 564, and 566 are formed on leading edge surface 560 of slider 567. Hills 562, 564, and 566 are preferably composed of a material that is electrically insulating and thermally compatible with the slider substrate and the ceramic member to be formed on the hills, such as a ceramic material. The regions 563 and 565 between hills 562, 564 and 566 are then filled with an easily removable material to form a structure having an exposed top surface coplanar with the exposed top surface of hills 562, 564 and 566.

Figure 10:
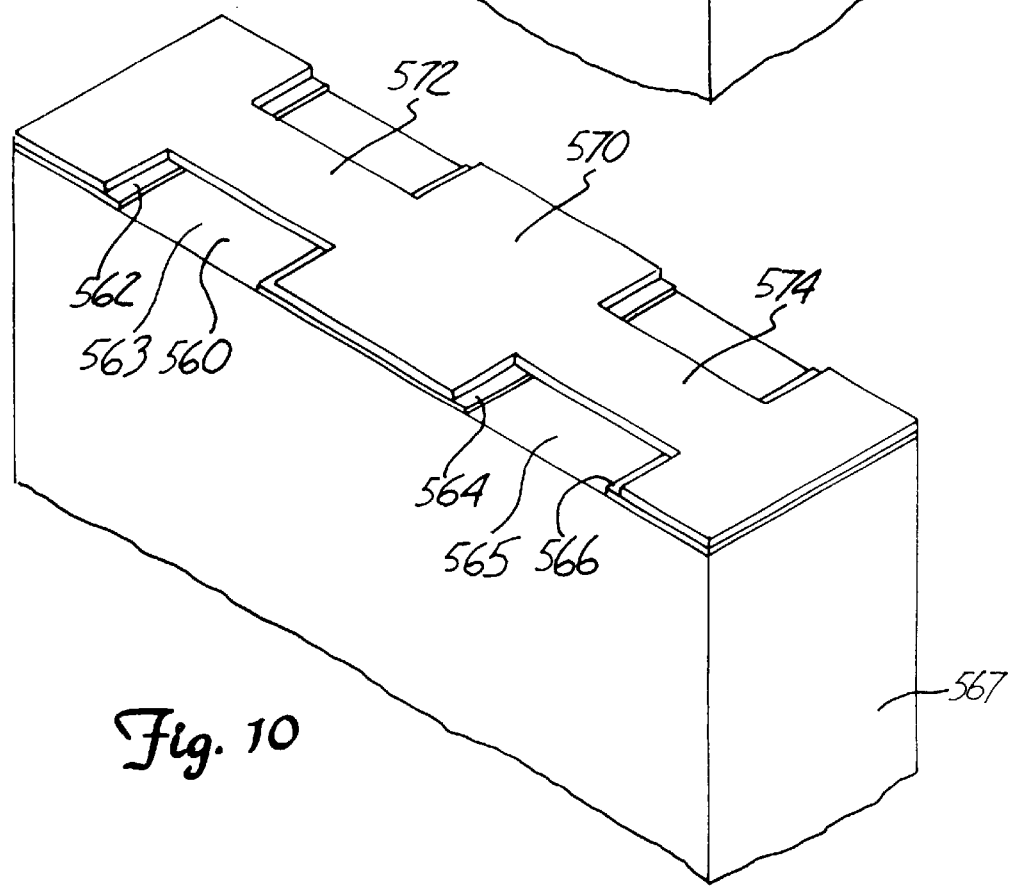

Subsequently, as shown in FIG. 10, ceramic member 570 formed of silica, alumina or zirconia, for example, is patterned on the planar surface formed by hills 562, 564 and 566 and regions of 563 and 565. Ceramic member 570 extends the entire width of leading edge surface 560 of slider 567, and includes beam 572 spanning region 563 between hills 562 and 564, and beam 574 spanning region 565 hills 566 and 564. After member 570 has been patterned, the material in regions 563 and 565 beneath structural beams 572 and 574 is removed, thereby leaving beams 572 and 574 to span the space between hills 562 and 564 and hills 564 and 566, respectively. For example, the material in regions 563 and 565 may be a metal that is removed by chemical etching, or a polymer or salt that is dissolved. Member 570 will be the carrier for the microactuator to control the positioning of slider 567, with structural beams 572 and 574 bending toward or away from slider 567 under the control of the microactuator.

Figure 11:
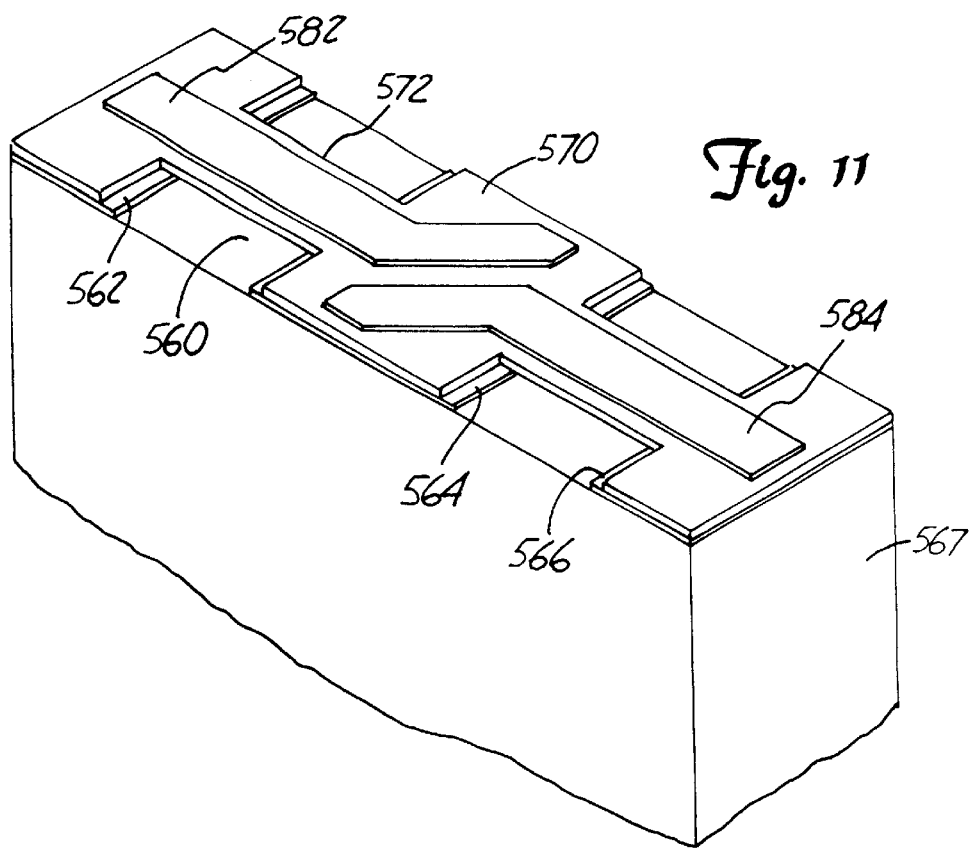
Figure 12:
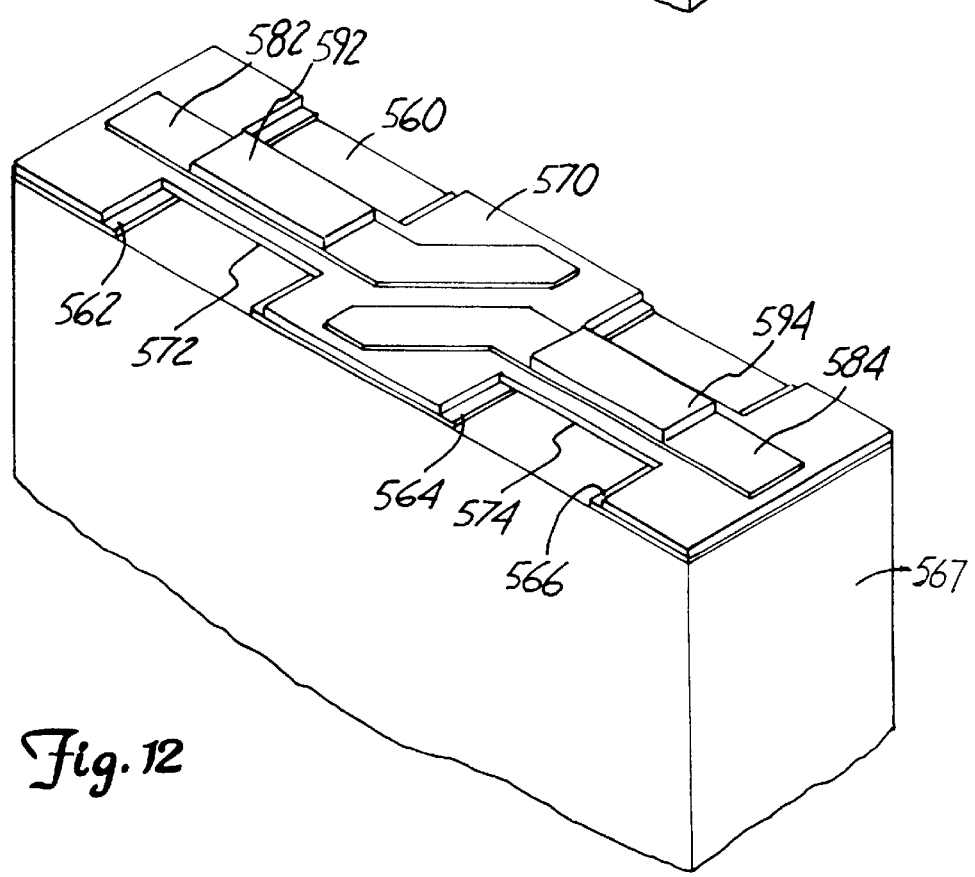

As shown in FIG. 11, bottom electrical conductors 582 and 584 are formed on member 570. The conductors preferably extend nearly to the lateral edges of slider 567 to permit connection to driving electronics (not shown) outside of the active area formed by beams 572 and 574 of the microactuator. As shown in FIG. 12, piezoelectric elements 592 and 594 are patterned on bottom electrical conductors 582 and 584, respectively, directly over the respective beams 572 and 574. Piezoelectric elements 592 and 594 are preferably patterned only over beams 572 and 574 to facilitate bending and reduce undesirable stresses on the materials of the microactuator.

Figure 13:
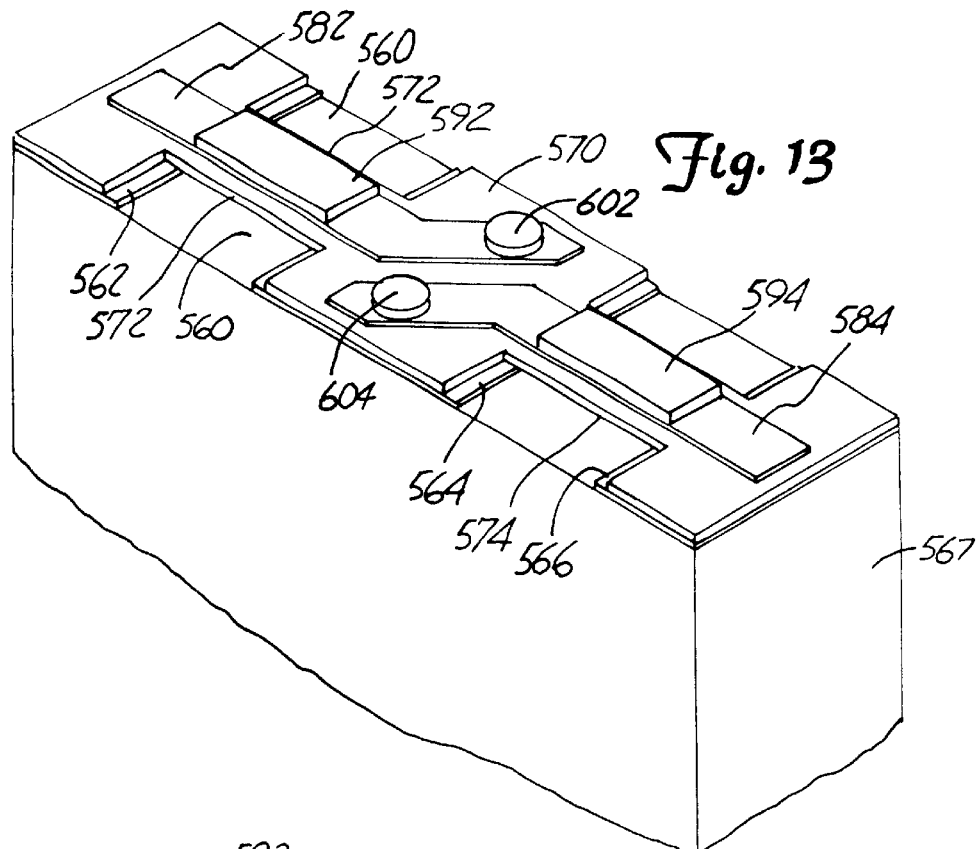
Figure 14:
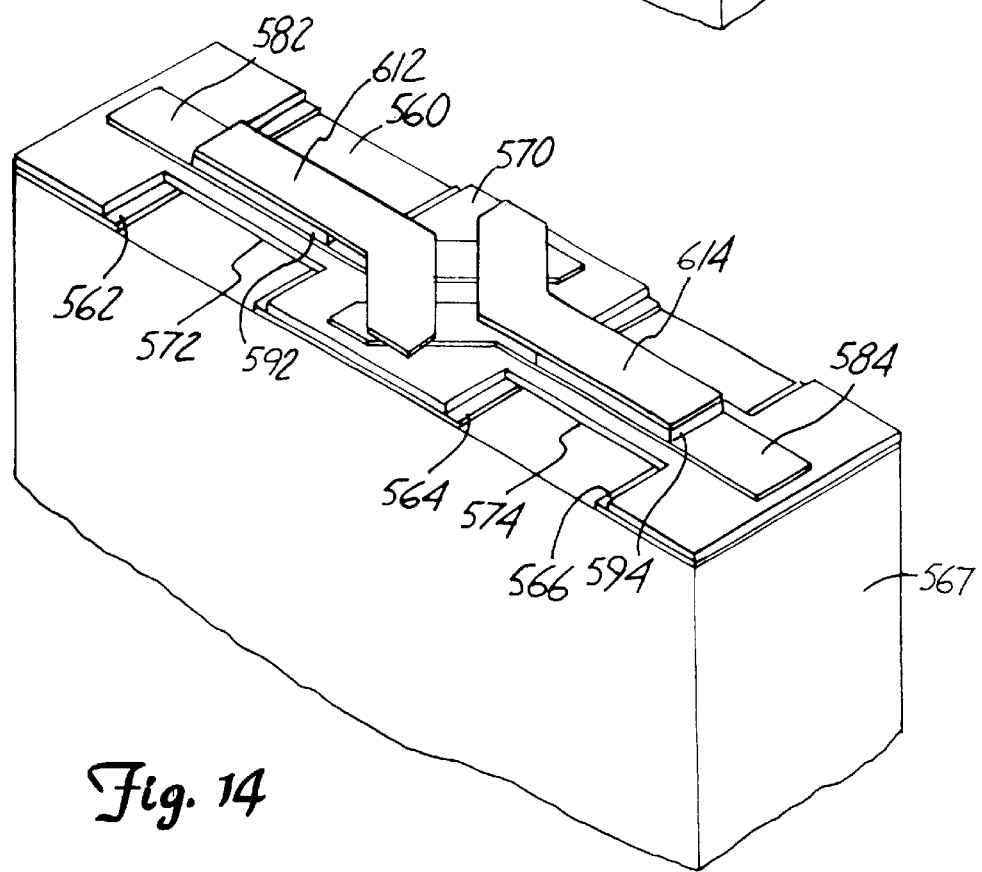

As shown in FIG. 13, conductive via structures 602 and 604 are patterned on bottom electrical conductors 582 and 584 near the center of slider 567, between the active microactuator beams 572 and 574. An insulating planarization layer structure, composed of a material such as compliant epoxy is applied over the structure, creating a planar surface that includes the top surfaces of piezoelectric elements 592 and 594, and via structures 602, 604. The spaces under beams 572 and 574 are preferably masked off to prevent material from being deposited therein. After the insulating planarization layer is applied, top electrical conductors 612 and 614 are patterned as shown in FIG. 14, contacting via structures 602 and 604 and the top surfaces of piezoelectric elements 592 and 594. Functionally, the configuration shown in FIG. 14 is a completed microactuator structure for slider 567.

Figure 15:
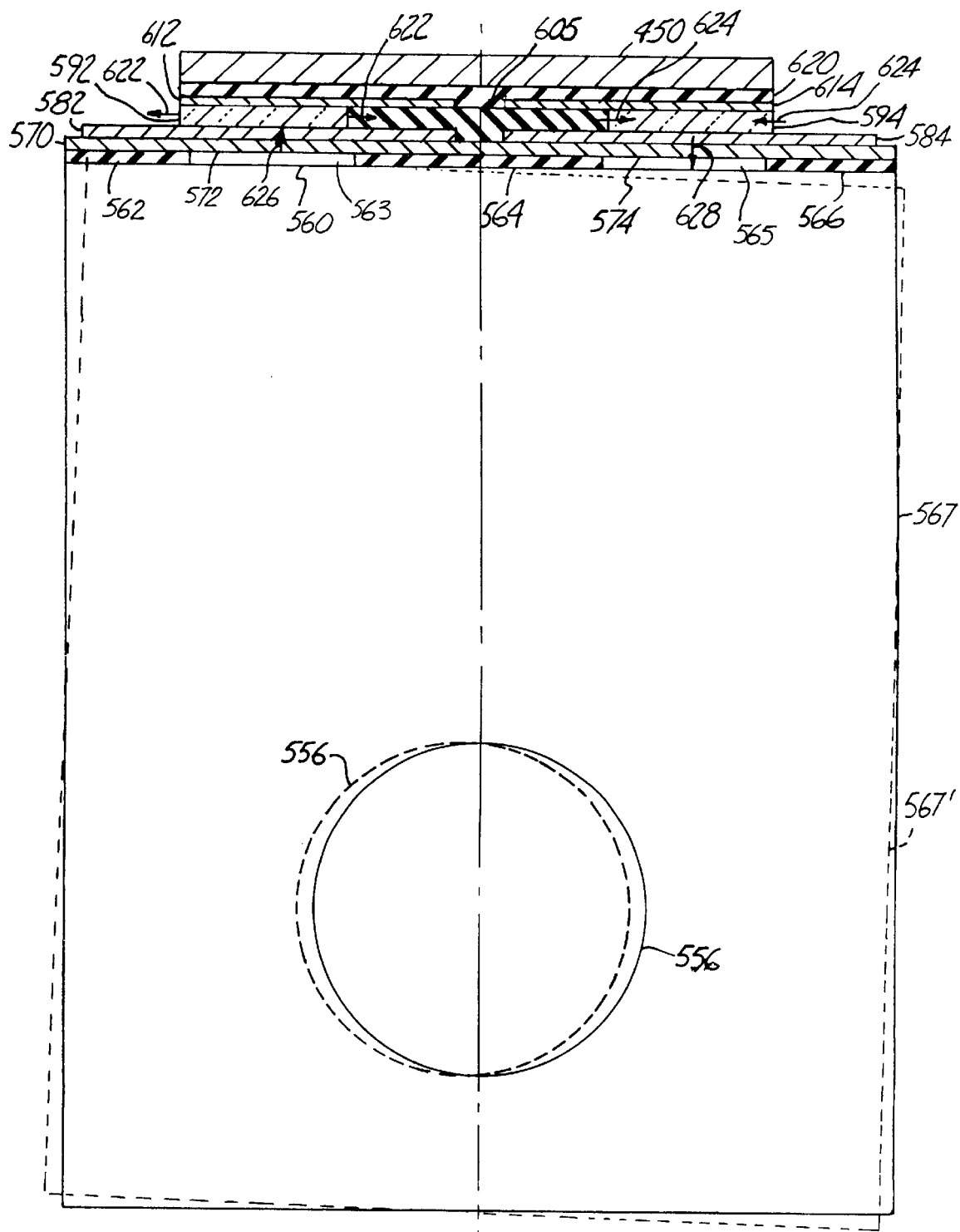
FIG. 15 is a top section view of a completed piezoelectric microactuator formed on a leading edge surface of the slider according to the embodiment of FIGS. 9–14.

FIG. 15 is a section view of the layers and materials of the microactuator formed on leading edge surface 560 of slider 567. In order to implement slider 567 in a disc drive system, encapsulating layer 620 is provided over the microactuator formed of a compliant epoxy material, for example, and is bonded (such as by adhesive) to flexure tab surface 450 (FIG. 7). Thus, the microactuator reacts against flexure tab surface 450 to position lens assembly 556 of slider 567 with respect to concentric tracks of a rotating disc.

In operation, a first voltage is applied to bottom electrical conductor 582, and a second voltage is applied to bottom conductor 584. Via structure 602 connects the first voltage to top electrical conductor 614, and via structure 604 connects the second voltage to top electrical conductor 612. Thus, the voltage differences across piezoelectric elements 592 and 594 are equal but opposite. In response to the voltage differences, one of the piezoelectric elements 592 and 594 longitudinally expands while the other longitudinally contracts. In the example shown in FIG. 15, piezoelectric element 592 expands in the direction of arrows 622, while piezoelectric element 594 contracts in the direction of arrows 624.

The expansion of piezoelectric element 592 causes structural beam 572 of member 570 to bend upward (away from slider 567) in the direction of arrow 626. Conversely, the contraction of piezoelectric element 594 causes structural beam 574 of member 570 to bend downward (toward slider 567) in the direction of arrow 628. These bending actions cause slider 567 to be rotationally displaced to the position 567' shown in dashed lines. Lens assembly 556, at the trailing edge of slider 567, is displaced to the position 556' shown in dashed line as well. Thus, application of voltages to bottom electrical conductors 582 and 584 produces controllable displacement of lens assembly 556 at the trailing edge of slider 567. This displacement moves lens assembly 556 within a fixed beam of light, thus changing the location of a focused spot on the disc without changing the angle of incidence of the light beam on the lens assembly.

Figure 16:
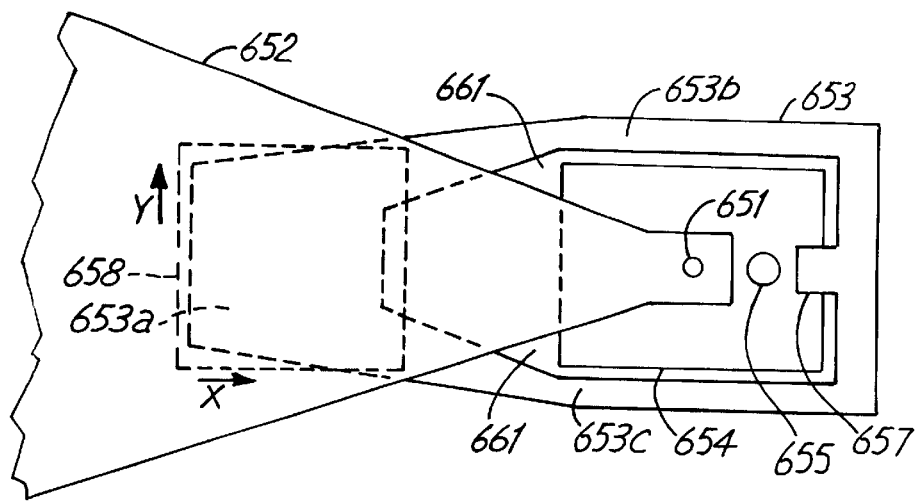
FIGS. 16 and 17 show top and side views, respectively, of a fine control actuator positioned between a load beam and a gimbal in one embodiment of the present invention.
Figure 17:
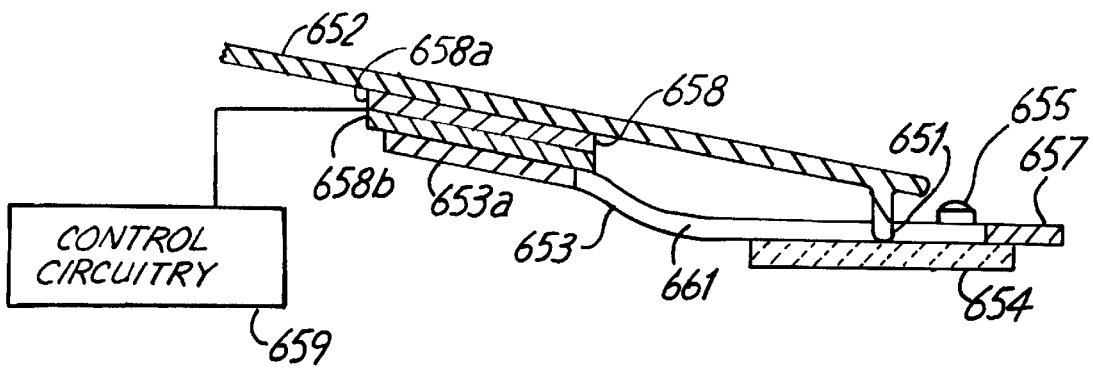

FIGS. 16 and 17 show an additional microactuator for moving a lens assembly in a fixed light beam according to another embodiment of the present invention. Linear motor 658 is attached between head suspension load beam 652 and gimbal 653, which in turn carries slider 654 connected to tongue portion 657 of gimbal 653 near a distal end of slider 654. Slider 654 carries optical lens assembly 655. Gimbal 653 is preferably constructed with rectangular portion 653a at a proximal end, and arm portions 653b and 653c extending toward a distal end, forming aperture 661 between arm portions 653b and 653c. Rectangular portion 653a of gimbal 653 is attached to rotor 658b of motor 658, so that linear movement of rotor 658b in the X and/or Y directions effects rigid-body linear movement of gimbal 653 and slider 654. Suspension load beam 652 applies pre-load force to slider 654 at pre-load tip 651 inside aperture 661 of gimbal 653. Pre-load tip 651 slides across the top surface of slider 654 as movement of slider 654 occurs. Linear motor 658 is responsive to control signals from control circuitry 659 to linearly expand in the X and/or Y directions. Motor 658 includes stator 658a and rotor 658b (depicted symbolically in FIG. 17), and is preferably arranged with stator 658a attached to load beam 652 and rotor 658b attached to gimbal 653, so that linear displacement of rotor 658b results in rigid-body motion of lens assembly 655. Any two-dimensional movement of lens assembly 655 can be achieved by selective displacement (such as expansion or contraction) of motor 658 in the X and Y directions, controlled by signals from control circuitry 659.

Again, because motor 658 is a discrete component separate from the design of head suspension 652, gimbal 653, and slider 654, any small-scale linear motor technology (many of which are known in the art) may be used. Linear micromotors may operate via parallel plates attached to a fixed stator and a mobile rotor of the motor in opposing pairs. A control signal, such as a voltage, is applied to the pairs of plates to move the rotor with respect to the stator. The motor is preferably configured with parallel plates to cause linear motion in the X direction, and parallel plates configured to cause perpendicular linear motion in the Y direction. The design flexibility of the present invention, which permits the use of several existing micromotor designs, simplifies the design of high resolution lens assembly positioning mechanisms for optical and magneto-optical disc drives.

Figure 18:
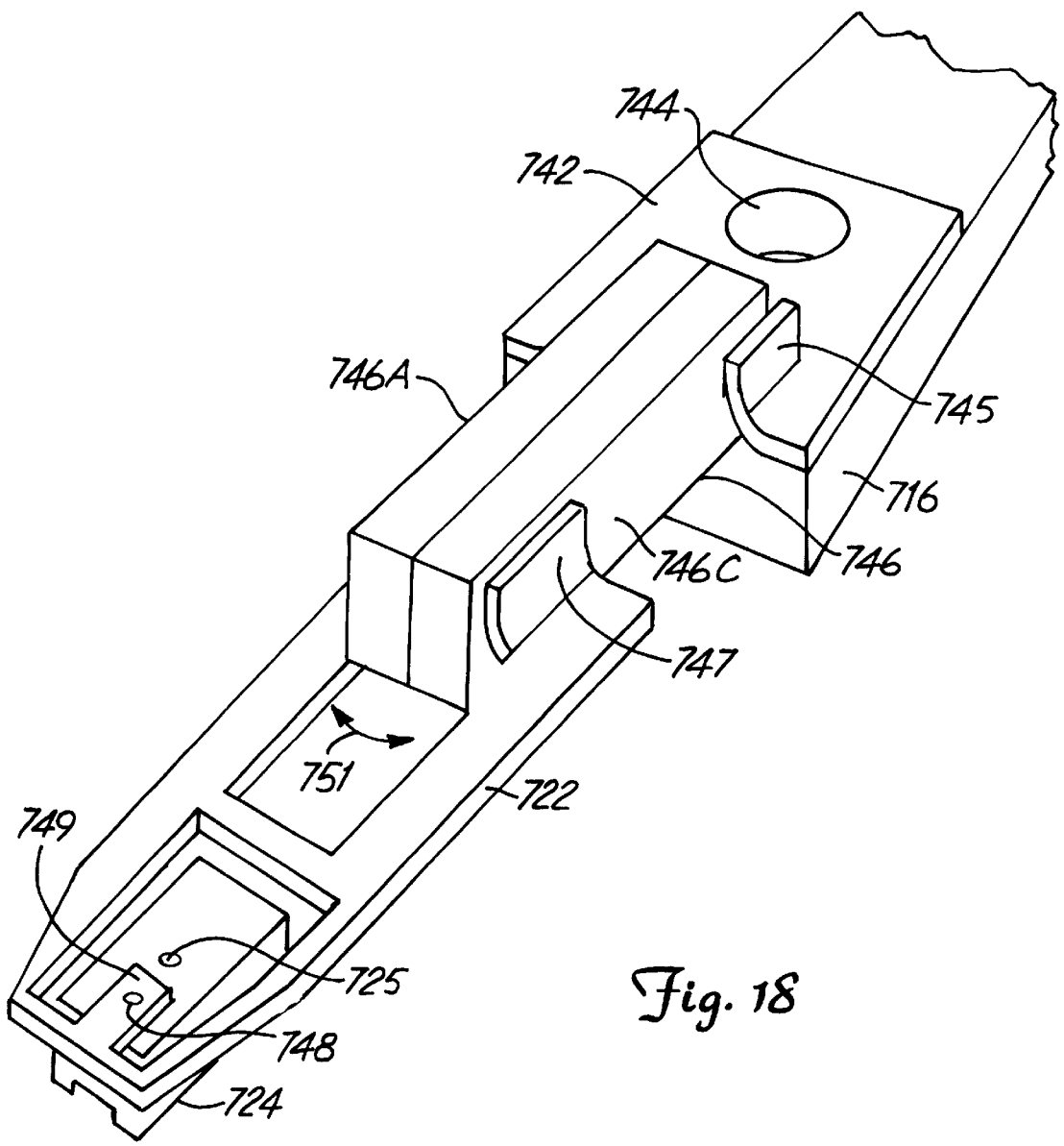
FIG. 18 is a perspective view of a lens support assembly with a bimorph piezoeolotric microactuator connected between an actuator arm and a load beam in accordance with one embodiment of the present invention.

FIG. 18 is a perspective view of a slider 724, a flexure 722, and actuator arm 716 showing an additional microactuator configuration under an additional embodiment of the present invention. A bimorph piezoelectric microactuator 746 comprising piezoelectric layers 746a and 746c is clamped at one end by swaged flaps 745 of a swage plate 742, and at its other end by swaged flaps 747. Swaging is shown as an exemplary means for attaching microactuator 746; it will be apparent to one skilled in the art that other means of attachment may be employed. Swage plate 742 is connected to actuator arm 716 through aperture 744, or by a similar connection mechanism. Slider 724 is attached to flexure 722 in a manner known in the art. In the exemplary embodiment shown in FIG. 18, the trailing edge of slider 724 is attached to tongue portion 749 at gimbal point 748. Slider 724 includes lens assembly 725 near its center.

In operation, a voltage is applied to piezoelectric layers 746a and 746c of bimorph piezoelectric microactuator 746, causing one of the piezoelectric layers to expand and the other to contract along the length between plate 742 and flexure 722, thereby causing microactuator 746 to bend in the direction of arrows 751. Movement of microactuator 746 results in corresponding movement of flexure 722 and slider 724, thereby selectively changing the position of lens assembly 725 with respect to a light beam generated by a light source as discussed above in connection with FIG. 3.

Figure 19:
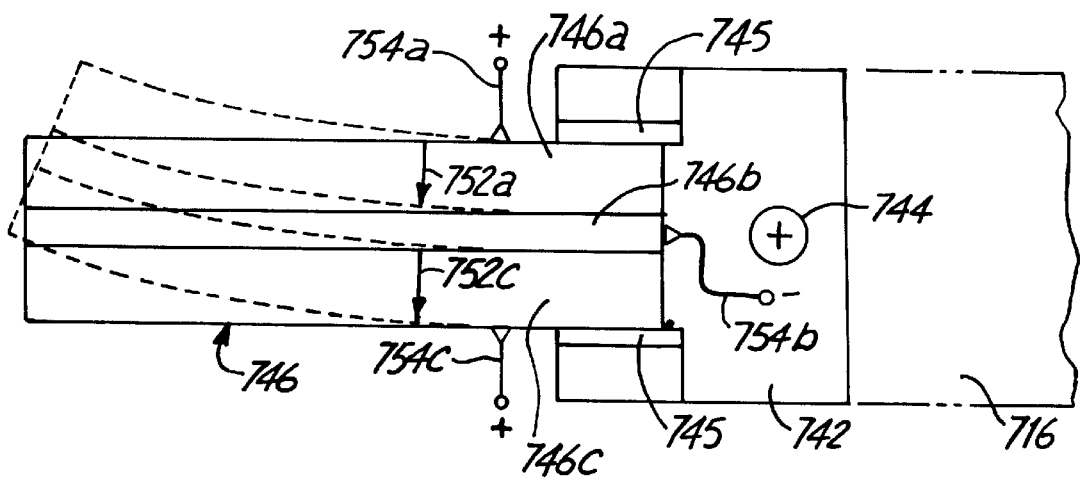
FIG. 19 is a top view of the bimorph piezoelectric microactuator shown in FIG. 18.

FIG. 19 is an enlarged view of piezoelectric microactuator 746 restrained at one end by swaged flaps 745 of plate 742. Microactuator 746 includes first piezoelectric layer 746a, second piezoelectric layer 746c, and center metal shim 746b bonded between the piezoelectric layers by conductive adhesive. In the "parallel" configuration depicted in FIG. 19, piezoelectric layers 746a and 746c are poled in the direction of arrows 752a and 752c. A first voltage is applied at terminal 754a to piezoelectric layer 746a, and at terminal 754c to piezoelectric layer 746c. A second voltage is applied at terminal 754b to metal shim 746b. Thus, in the "parallel" configuration, piezoelectric layer 746a will contract, and piezoelectric layer 746c will expand, in response to the first and second voltages applied at the terminal. The result is a bending motion (shown in phantom) of piezoelectric microactuator 746, since swage plate 742 restrains one end of microactuator 746. The amount of bending of microactuator 746, and thus the amount of displacement of slider 724 (FIG. 18) connected to microactuator by flexure 722, is precisely controlled by the voltages applied to terminals 754a, 754b and 754c. Thus, microactuator 746 is able to provide high resolution positioning of slider 724 over a selected track of a disc.

Figure 20:
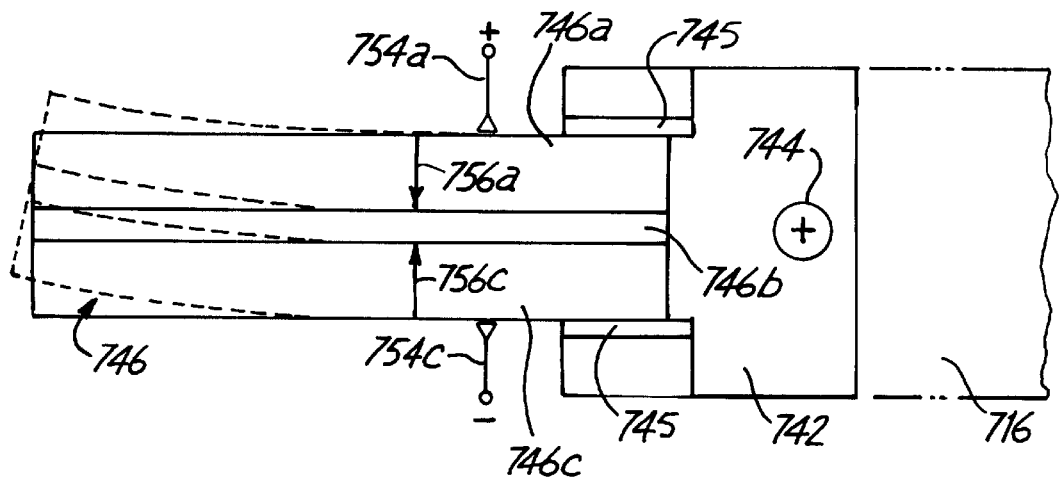
FIG. 20 is a top view of an alternative embodiment of the piezoelectric microactuator shown in FIG. 18.

In an alternative embodiment depicted by FIG. 20, piezoelectric miroactuator 746 is constructed in a "series" configuration. Piezoelectric layer 746a is poled in the direction of arrow 756a, and piezoelectric layer 746c is poled in the opposite direction, shown by arrow 756c. A first voltage is applied at terminal 754a to piezoelectric layer 746a, and a second voltage is applied at terminal 754c to piezoelectric layer 746c. As a result, piezoelectric microactuator 746 bends as indicated in phantom, since one end of microactuator 746 is restrained by swage plate 742. The "series" configuration is simpler and more economical than the "parallel" configuration, since it requires only two connections to the outside surfaces of piezoelectric layers 746a and 746c. However, the "series" configuration yields less deflection per volt of applied potential than the "parallel" configuration shown in FIG. 20. The "parallel" configuration is more complex, requiring three electrical connections, the additional connection being made to the center shim. Either of the configurations shown in FIGS. 19 and 20 art acceptable for effecting high resolution positioning of slider 724 over a selected track of a disc.

Figure 21:
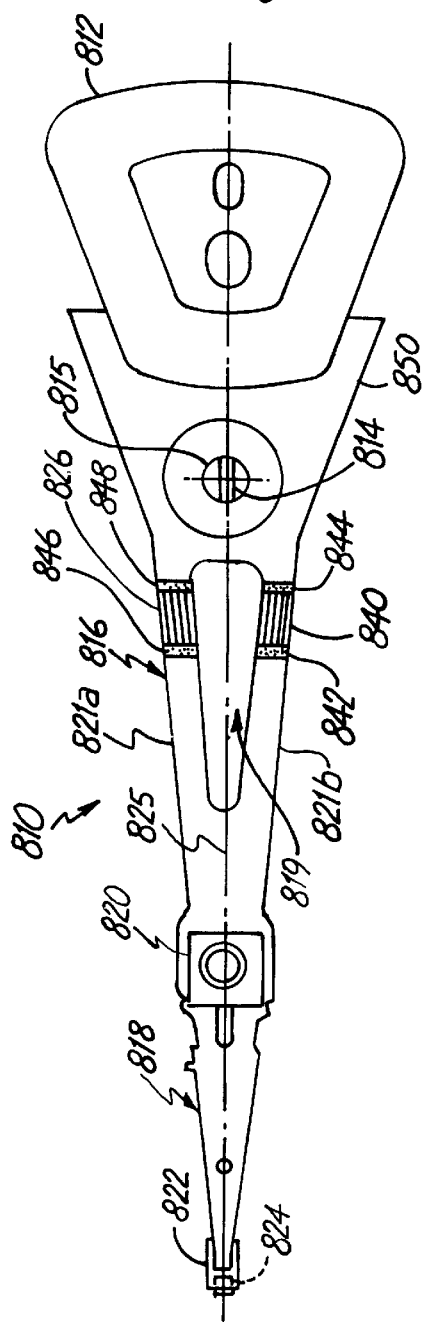
FIG. 21 is a top view of a lens support assembly showing piezoelectric elements embedded in opposite sides of an actuator arm in accordance with one embodiment of the present invention.

FIG. 21 is a top view of an actuation system 810 showing an additional alternative location for a microactuator under an additional embodiment of the present invention. Actuation system 810 includes a voice coil motor 812 operable to rotate actuator arm 816 and an optical light production system (not shown) about an axis 814 of a shaft 815. A head suspension 818 is connected to a distal end of actuator arm 816 by head suspension mounting block 820. Gimbal 822 is attached to a distal end of head suspension 818 and a slider 824 is mounted to gimbal 822 in a manner known in the art. Actuator arm 816 includes a space 819 forming arm side portions 821a and 821b on each side of a longitudinal axis 825.

Side portions 821a and 821b are joined to a pivoting portion 850 of actuator arm 816 by two microactuators. The microactuator connected to side portion 821a is formed by a piezoelectric element 826 located between two conductive element 846 and 848. The microactuator connected to side portion 821b is formed by a piezoelectric element 840 located between two conductive elements 842 and 844. Piezoelectric elements 826 and 840 are preferably implemented with opposite polarities, so that an identical voltage introduced across terminals 846, 848 and 842, 844 of both piezoelectric elements induces expansion of one piezoelectric element and contraction of the other piezoelectric element. This complementary arrangement of piezoelectric elements allows a distortion of actuator arm 816 to be achieved, thereby enabling displacement of slider 824.

As in the above embodiments, slider 824 supports a lens assembly that moves within a fixed beam of light when the piezoelectric elements are activated. This allows the location of a focused spot of light on the disc to change without changing the direction of propagation of the light beam toward the lens assembly and without activating voice coil motor 812.

Figure 22:
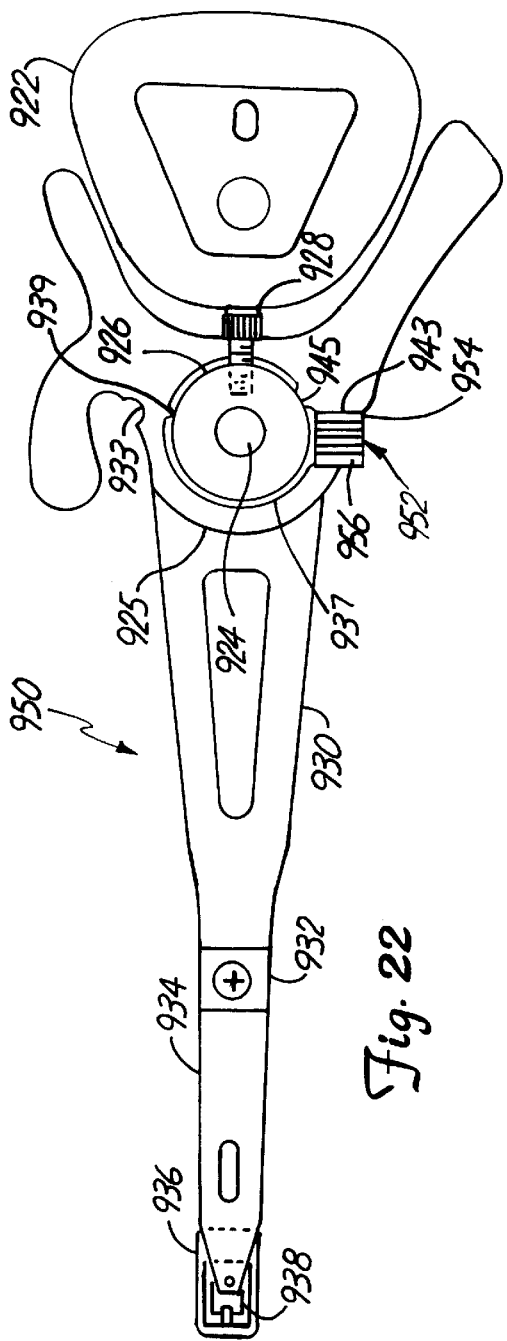
FIG. 22 is a top view of a lens support assembly having a piezoelectric microactuator located in an actuator arm according to a further embodiment of the present invention.

FIG. 22 is a top view of a disc drive actuation assembly 950 according to a further embodiment of the present invention. Disc drive actuation assembly 950 includes voice coil motor (VCM) 922, body 925, actuator arm 930 extending from body 925, load beam 934 connected to actuator arm 930 at head mounting block 932, and gimbal 936 connected at a distal end of load beam 934 to support slider 938, which in turn carries a lens assembly.

Pivot cartridge 926 is provided in cavity 937 in body 925, and is rigidly fastened to body 925 at one end, such as by one or more screws 928. Piezoelectric element 952 is provided in body 925 and includes terminals 954 and 956. Body is supported at three points to pivot cartridge 926: at fastener 928 along the longitudinal axis of body 925, at a point 945 adjacent to proximal end 943 of piezoelectric element 952, and at hinge point 939.

VCM 922 is operated in a manner known in the art to rotate body 925, pivot cartridge 926, and a light production system (not shown) around axis 924 and thereby coarsely position slider 938 over selected tracks of a disc. For more precise movements of slider 938 through a fixed beam of light produced by the light production system, piezoelectric element 952 is selectively expanded or contracted along its axis by applying a voltage to terminals 954 and 956, distorting body 925 to alter the position of slider 938. Relief 933 is preferably formed in body 925 adjacent to hinge point 939, to facilitate distortion of body 925 in response to expansion or contraction of piezoelectric element 952. Alternatively, a portion of body 925 near hinge point 939 may be composed of compliant material to achieve this result.

Through the movement caused by piezoelectric element 952, the lens assembly on slider 938 is able to move to different locations within a beam of light that is directed into the page of FIG. 22 by the light production system that is moved by voice coil motor 922. The movement of the lens assembly allows a spot of light on the disc to move across tracks without activating voice coil motor 922 and without changing the angle of incidence of the light beam into the lens assembly.

Although the present invention has been described with reference to preferred embodiments, workers skilled in the art will recognize that changes may be made in form and detail without departing from the spirit and scope of the invention.

What is claimed is:

1. A storage device for retrieving data stored on a medium, the storage device comprising:
    a light source capable of generating and directing light toward the medium;
    lens positioning means for positioning a lens over the medium such that a portion of the light passes through the lens.

2. A storage device for retrieving data stored on a medium, the storage device comprising:
    a lens having a focal axis;
    a light source capable of generating light having a direction of propagation substantially parallel to the focal axis of the lens as the light approaches the lens;
    a support assembly comprising a slider for supporting the lens over the medium; and
    a lens actuator, coupled to the support assembly and capable of moving the lens relative to the light while maintaining the focal axis of the lens substantially parallel to the direction of propagation of the light approaching the lens.

3. The storage device of claim 2 further comprising a coarse actuator capable of moving the lens actuator, the support assembly and the lens such that the position of the light relative to the lens is substantially constant while the coarse actuator is moving the lens.

4. The storage device of claim 2 wherein the lens actuator is connected to the slider and the lens.

5. The storage device of claim 2 wherein the lens actuator is connected to first and second portions of the slider, the first portion of the slider being in contact with the lens, the second portion of the slider being separated from the lens by the lens actuator.

6. The storage device of claim 2 wherein the support assembly further comprises a gimbal connected to the slider and wherein the lens actuator is formed between a portion of the gimbal and a portion of the slider.

7. The storage device of claim 2 wherein the support assembly further comprises a gimbal connected to the slider and a load beam connected to the gimbal.

8. The storage device of claim 7 wherein the lens actuator is connected to the load beam.

9. The storage device of claim 8 wherein the lens actuator is connected between the load beam and the gimbal.

10. The storage device of claim 7 wherein the support assembly further comprises an actuator arm coupled between the load beam and a body of a support assembly actuator.

11. The storage device of claim 10 wherein the lens actuator is located between the actuator arm and the load beam.

12. The storage device of claim 10 wherein the lens actuator is located along the actuator arm.

13. The storage device of claim 10 wherein the lens actuator is located within the body of the support assembly actuator.

14. A disc drive for a computer system, the disc drive comprising:
- a disc;
- a lens, capable of directing light incident on the lens;
- a light beam production assembly, capable of creating a light beam and of directing the light beam toward the lens;
- a lens support structure, comprising a slider capable of supporting the lens;
- a coarse actuator coupled to the light beam production assembly and the lens support structure and capable of moving the lens support structure and the light beam production assembly so that the lens moves to different positions over the disc while substantially maintaining a position of the light beam relative to the lens; and
- a fine actuator, coupled to the lens support structure and capable of moving the lens while substantially maintaining a position of the light beam relative to the disc.

15. The disc drive of claim 14 wherein the light beam has a cross-sectional area that is larger than the lens such that when the fine actuator moves the lens the amount of light incident on the long remains substantially constant.

16. The disc drive of claim 14 wherein the light beam propagates toward the lens to form an angle of incidence at the lens, the angle of incidence remaining substantially constant as the fine actuator moves the lens.

17. The disc drive of claim 14 wherein the slider incorporates the fine actuator.

18. The disc drive of claim 14 wherein the lens support structure further comprises a gimbal and wherein the fine actuator is positioned between the gimbal and the slider.

19. The disc drive of claim 14 wherein the lens support structure further comprises a load beam and an actuator arm and wherein the fine actuator is positioned along the actuator arm.

* * * * *

UNITED STATES PATENT AND TRADEMARK OFFICE
CERTIFICATE OF CORRECTION

PATENT NO. : 6,288,985 B1  
DATED : September 11, 2001  
INVENTOR(S) : Jordache et al.

Page 1 of 1

It is certified that error appears in the above-identified patent and that said Letters Patent is hereby corrected as shown below:

<u>Column 14, claim 15,</u>  
Line 4, replace "long" with -- lens --.

Signed and Sealed this

Fifth Day of March, 2002

Attest:

Attesting Officer

JAMES E. ROGAN  
*Director of the United States Patent and Trademark Office*